(12) United States Patent
Lindborg

(10) Patent No.: US 6,182,930 B1
(45) Date of Patent: Feb. 6, 2001

(54) PACKING PIECE HALF FOR A CABLE LEAD-THROUGH

(75) Inventor: Erik Lindborg, Karlskrona (SE)

(73) Assignee: MCT Brattberg Aktiebolag, Karlskrona (SE)

( * ) Notice: Under 35 U.S.C. 154(b), the term of this patent shall be extended for 0 days.

(21) Appl. No.: 09/155,049

(22) PCT Filed: Mar. 12, 1997

(86) PCT No.: PCT/SE97/00421

§ 371 Date: Sep. 18, 1998

§ 102(e) Date: Sep. 18, 1998

(87) PCT Pub. No.: WO97/36356

PCT Pub. Date: Oct. 2, 1997

(30) Foreign Application Priority Data

Mar. 22, 1996 (SE) .................................................... 9601117

(51) Int. Cl.[7] .................................................... F16L 3/00
(52) U.S. Cl. ............................................ 248/49; 248/74.1
(58) Field of Search ........................... 248/49, 65, 909, 248/74.1, 58, 68.1, 72, 74.4; 174/48, 156

(56) References Cited

U.S. PATENT DOCUMENTS

| | | | | |
|---|---|---|---|---|
| 1,718,259 | * | 6/1929 | Scott et al. | 248/74.1 |
| 1,984,355 | * | 12/1934 | Abbott | 247/3 |
| 2,002,103 | * | 5/1935 | Wheeler | 137/75 |
| 2,889,016 | * | 6/1959 | Warren | 189/34 |
| 3,554,474 | * | 1/1971 | Davies | 248/49 |
| 4,017,046 | * | 4/1977 | Hicks | 248/49 |
| 4,393,998 | * | 7/1983 | Allen et al. | 248/74 |
| 4,403,758 | * | 9/1983 | Burt | 248/49 |
| 4,497,433 | * | 2/1985 | Wischusen, III | 229/30 |
| 4,858,861 | * | 8/1989 | Wilkenson, III | 248/74.1 |
| 4,870,722 | * | 10/1989 | Shell, Jr. | 248/74.1 |
| 4,871,134 | * | 10/1989 | Oikawa | 248/65 |
| 4,886,228 | * | 12/1989 | Kennedy | 248/74.1 |
| 5,149,017 | * | 9/1992 | McEntire et al. | 248/49 |
| 5,391,840 | * | 2/1995 | Hughes et al. | 174/68.3 |
| 5,435,506 | * | 7/1995 | Wiley | 248/74.1 |
| 5,873,550 | * | 2/1999 | Phillips | 248/74.1 |

FOREIGN PATENT DOCUMENTS

| | | |
|---|---|---|
| 3624900 | 2/1987 | (DE) . |
| 3635593 | 4/1988 | (DE) . |
| 4020180 | 7/1991 | (DE) . |
| 429916 | 6/1991 | (EP) . |
| 2186443 | 8/1987 | (GB) . |
| 1520815 | 12/1955 | (SE) . |

* cited by examiner

*Primary Examiner*—Anita M. King
*Assistant Examiner*—Gwendolyn Baxter
(74) *Attorney, Agent, or Firm*—Pillsbury Madison & Sutro LLP

(57) ABSTRACT

A packing piece half for a cable lead-through which may be adapted for different dimensions of cable is presented. A packing piece half includes a main portion which is essentially a parallelepiped and together with a second packing piece half, forms a rectangular cross section. The main portion has a cavity therein such that when placed together with the second packing piece half, a rectangular packing piece having a channel therethrough is formed. The packing piece half further includes upwardly directed tabs and/or horizontal tabs. Each tab is preferably integral to the main portion and has a frangible connection thereto. The tabs are constructed and arranged to be torn from the main portion and inserted into the cavity, thereby reducing its diameter to provide a tight fit to elongated members extending therethrough.

15 Claims, 4 Drawing Sheets

PACKING PIECE HALF FOR A CABLE LEAD-THROUGH

BACKGROUND OF THE INVENTION

1. Field of the Invention

The invention relates to a package piece half for a cable lead-through with a frame, said packing piece half forming, together with another packing piece half, an essentially parallellepipedic packing piece or pieces essentially filling the space in the frame, said packing piece half being provided with a cavity which, together with a corresponding cavity in the other packing piece half, forms a through-channel for a cable, a wire or the like, the size of said channel being adapted to the dimension of the cable, wire or the like in question.

2. Description of the Related Art

Packing pieces consisting of two packing piece halves for use in a cable lead-through are well known. The packing pieces are dimensioned in accordance with a module system which makes it possible to fill the space in the frame in a suitable manner, the packing pieces or at least some of them being provided with through-channels for cables, wires or the like. These known packing pieces or packing piece halves are made of a material which is somewhat elastic but in order to provide a good seal about the cable or wire in question, a packing piece must be selected with a channel of the correct dimension. This means that the packing piece halves must be made with a great number of different channel dimensions, in order to achieve a good seal against cables and wires of various dimensions. For small users with only limited stocks, this can mean that the desired packing piece will not always be available.

SUMMARY OF THE INVENTION

In view of the above, there is a need for packing pieces or packing piece halves which can be easily adapted to different dimensions of those cables, wires or the like which are to be led through the cable lead-through. This is achieved according to the invention with a packing piece half of the type described by way of introduction which is provided with at least one projecting tab which is so dimensioned that when folded in over the cavity it can be pressed down therein and thereby cover essentially the entire surface of the cavity, to reduce the size of the cavity.

With a packing piece, which is comprised of two packing piece halves according to the invention, it is possible in a simple manner to use the same packing piece for various dimensions of the cable, wire or the like to be lead through the lead-through. This makes stockholding for the small user simpler and less expensive, since a smaller variety of packing piece halves needs to be kept in stock.

Advantageous embodiments of the invention are described in the subclaims.

BRIEF DESCRIPTION OF THE DRAWINGS

The invention will be described in more detail below with reference to the accompanying drawings of which.

DETAILED DESCRIPTION OF THE INVENTION

Figure 1:
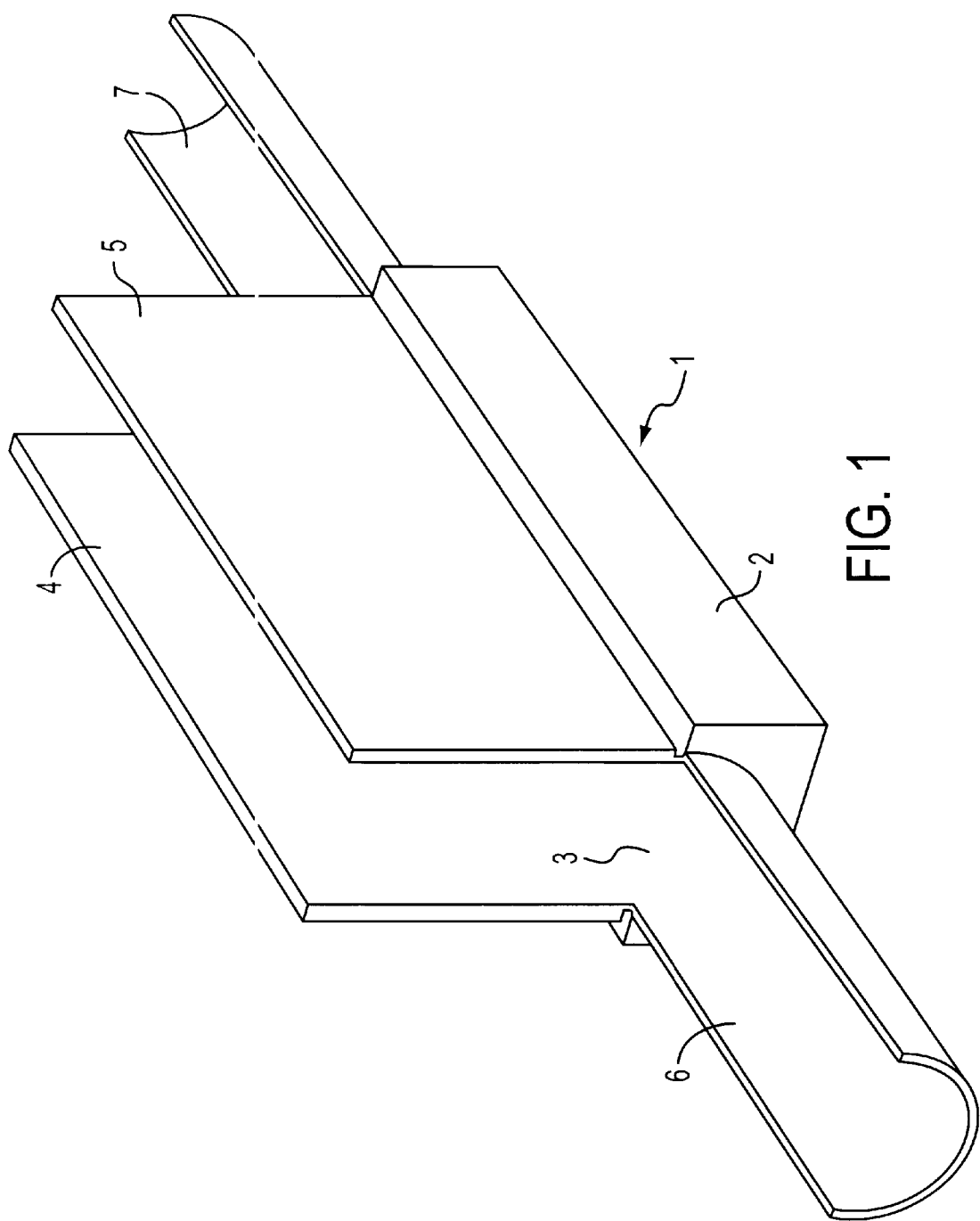
FIG. 1 is a perspective view of a packing piece half according to one embodiment of the invention.

FIG. 1 shows a packing piece half 1, which is intended to form a packing piece together with another packing piece half which is reversed and placed on top of the packing piece half shown in FIG. 1. This packing piece is intended to, alone or together with a number of other essentially identical packing pieces, to be disposed in a frame to form together therewith a sealing lead-through for cables, wires or the like through a wall or similar structure. The lead-through is thus of a type known per se, for example of the type shown in Swedish Patent Specification 152 815.

The packing piece half 1 has a main portion 2, which is essentially parallellepipedic and, together with an additional packing piece half of corresponding dimensions, creates preferably a square cross section. Thus the packing pieces fit as modules in the cable lead-through frame. The main portion 2 is provided with an essentially semicylindrical cavity 3 extending along the entire packing piece half 1 and constitutes half of a channel for a cable, a wire or the like which is to be sealingly led through the lead-trough. The other portion of the channel is formed by the corresponding cavity in the other packing piece half, which is thus placed on top of the packing piece half 1 as seen in FIG. 1.

The packing piece half 1 is also provided with two upwardly directed tabs 4 and 5 and two additional tabs 6 and 7. All of the tabs 4–7 are made in one piece with the main portion 2 and of the same material as the main portion. The upwardly directed tabs 4 and 5 are made in such a manner that their connections to the main portion 2 extend along the edges of the cavity 3, and the tabs 4 and 5 are essentially planar. As can be seen in the drawing, the tabs 4 and 5 are of different thickness and the reason for this will be described in more detail below.

The tabs 6 and 7 are essentially bowl-shaped with the same profile as the cavity 3, and they essentially form an extension of the cavity 3.

Figure 3:
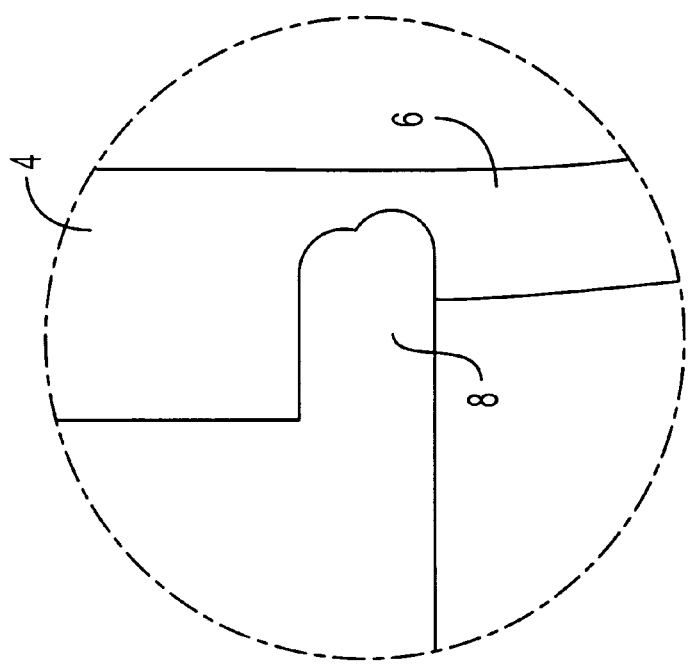
FIG. 3 is an enlarged detail view of the encircled area in FIG. 2.
Figure 2:
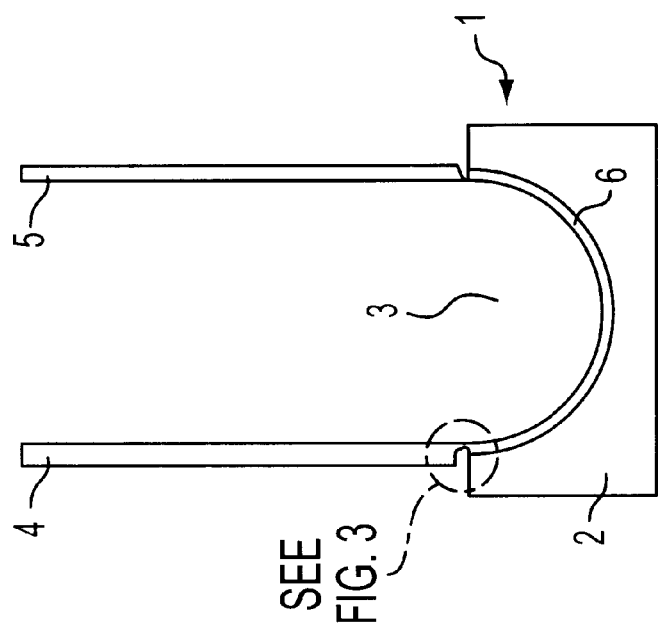
FIG. 2 is an end view of the packing piece half according to FIG. 1.

As can be seen in more detail in FIGS. 2 and 3, each of the tabs 4 and 5 is provided at its connection to the main portion 2 with a notch 8 or score making it possible to tear off the tab 4 or 5 from the main portion 2, if this should be desirable. The tabs 6 and 7 can also be provided with corresponding notches or scorings at their connections to the main portion 2.

The function of the tabs 4–7 is as follows. The cavity 3 in the main portion 2 has a predetermined radius and is thus intended for a cable, a wire or the like with a predetermined diameter. If the packing piece half 2 is to be used for sealing a lead-through for a cable, a wire or the like of smaller diameter than the diameter of the cavity 3, one or more of the tabs 4–7 can be folded into the cavity 3 to reduce its diameter. In order to be able to use the packing piece half for more dimensions of cables, wires or the like, the tabs 4 and 5 are of different thickness, as can be seen clearly in FIG. 2. It is also suitable that the tabs 6 and 7 have different thicknesses so that the range of use can be further increased.

The purpose of the notch 8 at the connection between the tab 4 or 5 and the main portion 2 is to make it possible to simply tear off the tab 4 or 5 if it is not to be used. This is necessary for the packing piece half 1 to be able to cooperate with a corresponding packing piece half and form a packing piece of the correct dimensions. This is also true of the tabs 6 and 7 which, if they are not used to reduce the dimensions of the cavity 3, can be left in their projecting position, but can also be torn off, if so desired.

In order to achieve the desired function of the tabs 4 and 5, it is suitable that they have a height, as seen in FIG. 2, which essentially corresponds to the curve dimension along the surface of the cavity 3.

Figure 4:
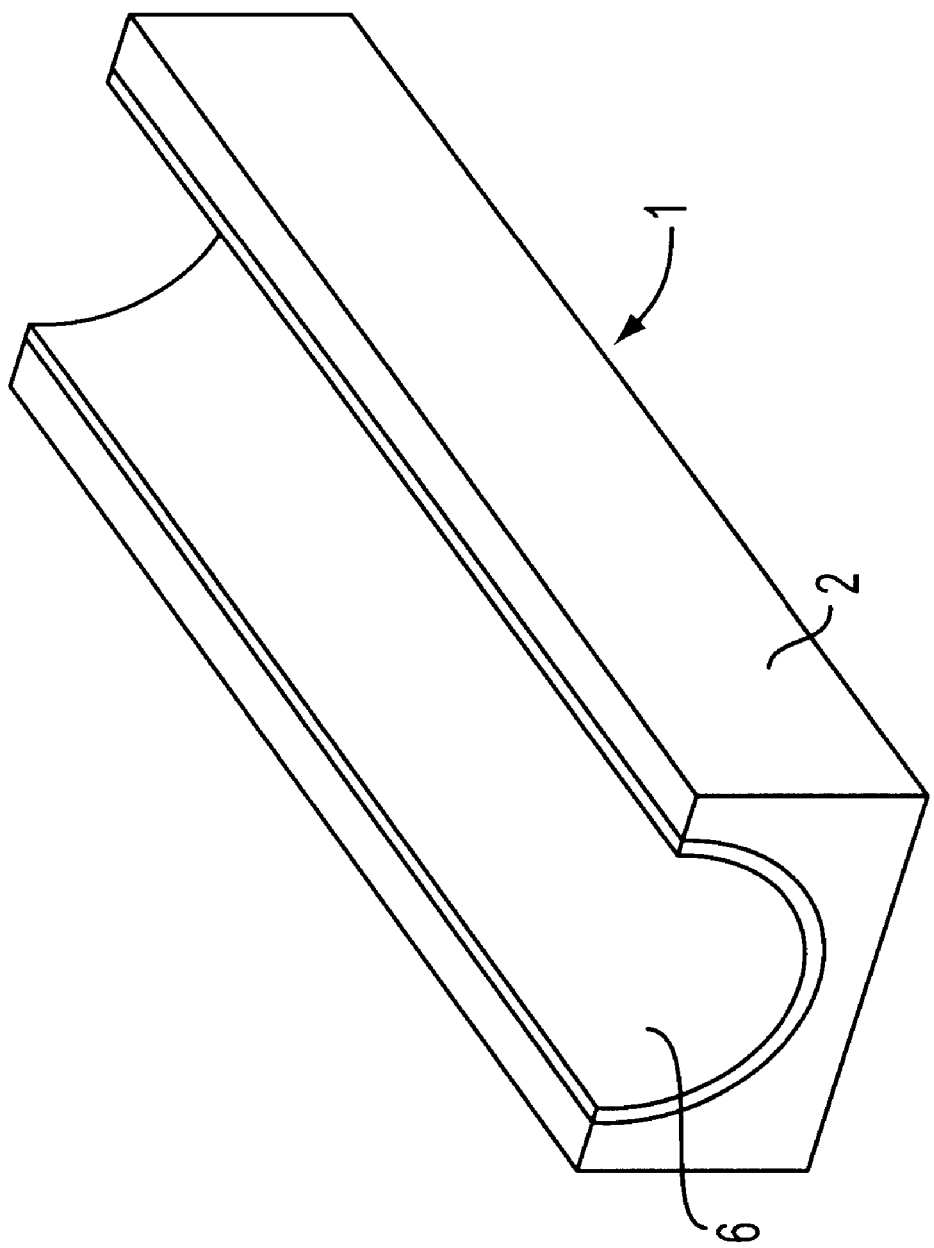
FIG. 4 is a perspective view of a packing piece half having a tab folded into the cavity.
Figure 5:
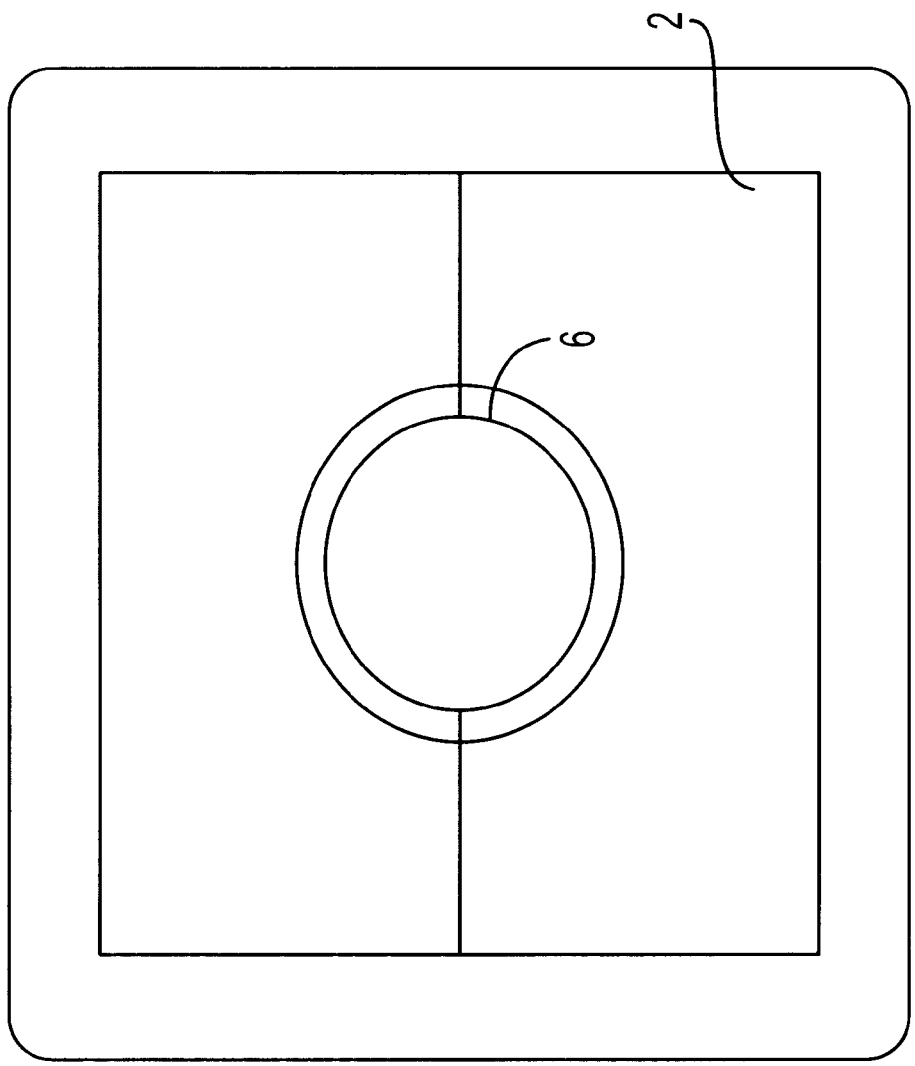
FIG. 5 is an end view showing a pair of packing piece halves disposed within a frame.

FIG. 4 shows a packing piece half as shown in FIG. 1. In FIG. 4, however, tab 6 has been folded into the cavity 3, thereby reducing the depth of the cavity. In addition, tabs 4, 5, and 7 have been torn off.

The invention is not limited to the examples described above. Rather, changes can be made within the scope of the following patent claims. For example, one or more of the tabs 4–7 can be left out. It is of course also possible that one or more of the tabs 4–7 can be torn off and thereafter be used as a loose insert in the cavity 3 to reduce its size to adapt it to the cable or wire in question. Furthermore, the cavity and the tabs can be provided with interengaging cavitities and projections to achieve locking against relative displacement.

What is claimed is:

1. A packing piece half, comprising:
    an elongated body member having a cavity formed therein;
    at least one projecting tab which is constructed and arranged to be disposed within the cavity, covering essentially the entire surface thereof and thereby reducing the size of the cavity,
    wherein, the packing piece half is constructed and arranged to be placed within a frame, to form, together with a second, similar packing piece half, an essentially parallelepipedic packing piece adapted to essentially fill a space in the frame and to provide a lead through channel for an elongated member, the channel defined by the cavity of each packing piece half,
    the connection between the tab and a main portion of the packing piece half comprising a tear score such that the tab may be torn from the main portion.

2. The packing piece half according to claim 1, wherein the tab is made in one piece with the packing piece half.

3. The packing piece half according to claim 2, comprising at least two tabs of different thickness.

4. The packing piece half according to claim 2, wherein a connection between the tab and a main portion of the packing piece half comprises a tear score such that the tab may be torn from the main portion.

5. The packing piece half according to claim 2, wherein the connection between the tab and the packing piece half extends along one edge of the cavity.

6. The packing piece half according to claim 2, wherein the tab extends out from the end surface of the packing piece half and is connected thereto along one end of the cavity.

7. The packing piece half according to claim 1, comprising at least two tabs of different thickness.

8. A packing piece half, comprising:
    an elongated body member having a cavity formed therein;
    at least one projecting tab which is constructed and arranged to be disposed within the cavity, covering essentially the entire surface thereof and thereby reducing the size of the cavity,
    wherein, the packing piece half is constructed and arranged to be placed within a frame, to form, together with a second, similar packing piece half, an essentially parallelepipedic packing piece adapted to essentially fill a space in the frame and to provide a lead through channel for an elongated member, the channel defined by the cavity of each packing piece half,
    wherein a connection between the tab and the packing piece half extends along one edge of the cavity.

9. The packing piece half according to claim 8, comprising at least two tabs of different thickness.

10. The packing piece half according to claim 8, wherein a tab extends out from the end surface of the packing piece half and is connected thereto along one end of the cavity.

11. The packing piece half according to claim 8, wherein the tab is made in one piece with the packing piece half.

12. The packing piece half according to claim 8, wherein a connection between the tab and a main portion of the packing piece half comprises a tear score such that the tab may be torn from the main portion.

13. A packing piece half, comprising:
    an elongated body member having a cavity formed therein;
    at least one projecting tab which is constructed and arranged to be disposed within the cavity, covering essentially the entire surface thereof and thereby reducing the size of the cavity,
    wherein, the packing piece half is constructed and arranged to be placed within a frame, to form, together with a second, similar packing piece half, an essentially parallelepipedic packing piece adapted to essentially fill a space in the frame and to provide a lead through channel for an elongated member, the channel defined by the cavity of each packing piece half,
    wherein the tab extends out from an end surface of the packing piece half and is connected thereto along one end of the cavity.

14. The packing piece half according to claim 13, comprising at least two tabs of different thickness.

15. The packing piece half according to claim 13, wherein the tab is made in one piece with the packing piece half.

* * * * *